United States Patent [19]

Willertz

[11] 4,325,259
[45] Apr. 20, 1982

[54] VIBRATION AMPLITUDE MEASURING DEVICE

[75] Inventor: Lothar E. Willertz, Monroeville, Pa.

[73] Assignee: Westinghouse Electric Corp., Pittsburgh, Pa.

[21] Appl. No.: 194,719

[22] Filed: Oct. 7, 1980

[51] Int. Cl.³ .............................................. G01N 29/04
[52] U.S. Cl. .................................................... 73/653
[58] Field of Search ................. 73/653, 652, 649, 660, 73/655, 658, 593

[56] References Cited

U.S. PATENT DOCUMENTS

| | | | |
|---|---|---|---|
| 3,267,725 | 8/1966 | Connaught | 73/652 |
| 3,859,847 | 1/1975 | Ronemus | 73/660 |
| 4,016,752 | 4/1977 | Carey | 73/652 |

*Primary Examiner*—Anthony V. Ciarlante
*Attorney, Agent, or Firm*—D. S. Wise

[57] ABSTRACT

The amplitude of mechanical vibration of a surface is measured by a photonic sensor coupled to an electronics package. The sensor is mounted inside a sensor housing which is inserted into a bore within a base housing. The base housing may be attached to a seismically independent surface or to the vibrating surface itself. The sensor housing is biased toward the open end of the bore in the base housing so that it contacts the vibrating surface, placing the sensor in communication with the vibrating surface. In this configuration, the sensor housing will remain substantially stationary at one peak of the vibration, tracking thermally induced changes in the position of the vibrating surface while the sensor and attached electronics package measures the amplitude of the surface vibration.

5 Claims, 3 Drawing Figures

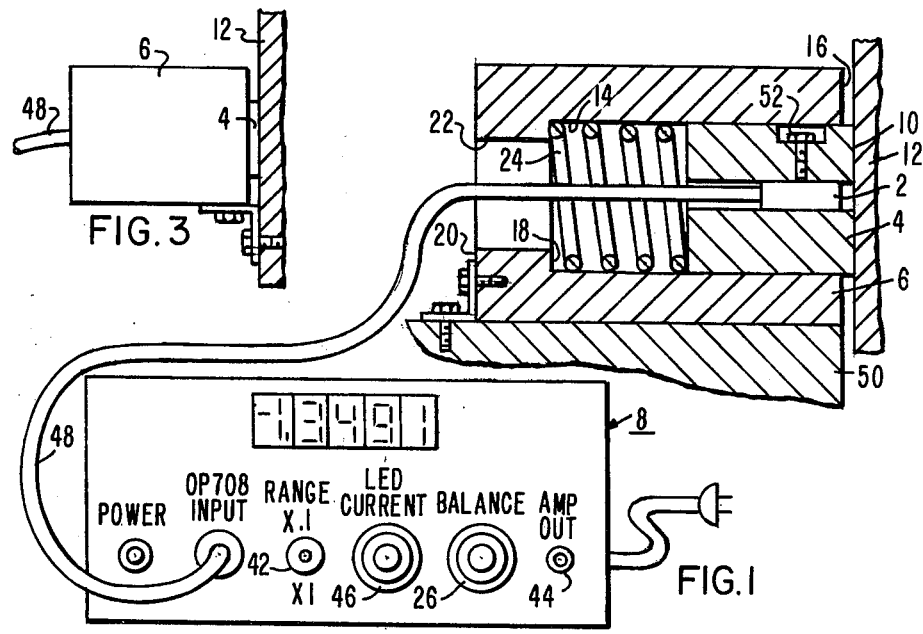
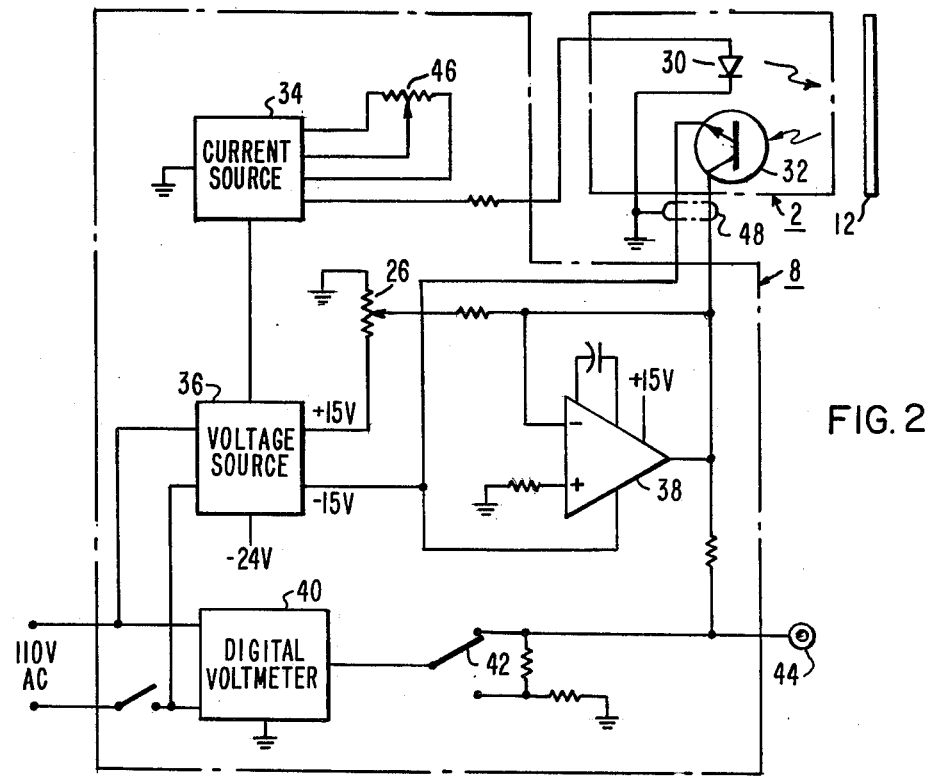

VIBRATION AMPLITUDE MEASURING DEVICE

BACKGROUND OF THE INVENTION

This invention relates generally to vibration monitoring devices and in particular to devices for measurement of mechanical vibration amplitudes, on the order of 0.001 inch, where the frequency of displacement is high, for example, in the range of 20,000 Hz, and where large electromagnetic fields in the surrounding area make the environment hostile to electronic devices.

Prior art vibration monitoring devices generally may be classified into two groups according to whether the vibration sensing probe physically contacts the vibrating surface. In those devices which do make physical contact with the vibrating surface, the vibration transducer, or a probe which influences in some manner the vibration transducer, is biased by some means, such as gravity or a spring, against the vibrating surface so as to track the actual surface vibrations. These devices are inherently limited to low frequency applications, with the tracking accuracy decreasing as the frequency of vibration increases. They are not suitable for high frequency applications such as the measurement of vibration amplitudes in a material during an ultrasonic fatigue test.

The second group of prior art devices are more suitable for higher frequency usage and comprise those in which the vibration-monitoring transducer does not contact the vibrating surface. One such known prior art device is a capacitance gage.

Capacitance is the ratio of the electric charge on one of two adjacent electrically conductive surfaces to the difference in electrical potential between the two surfaces. Capacitance is a constant for any given pair of conductors, being directly proportional to the area of the aforementioned charged surface and inversely proportional to the separation between the two surfaces.

A capacitance gage measures the separation between the gage sensor and a target material by determining the existing capacitance through the relationship between charge and potential difference described above and comparing the known geometry of the sensor. Since the surface area of the sensor is known, the distance between the sensor and the target may be calculated. For this technique to be effective, it is essential that the target material be held at earth potential so that the gage may accurately ascertain the difference in potential between the two surfaces. When placed approximately 0.010 inch from the vibrating surface, the capacitance gage is capable of detecting the amplitude of high frequency vibration with good accuracy.

Two disadvantages, however, prevent the capacitance gage from being ideal in all applications. First, because its accuracy is dependent upon the target material being at earth potential, any current flow in the target material, whether inherent or induced by an exterior magnetic field, disrupts the accuracy of the gage. Consequently, the capacitance gage is not suitable for use in environments comprising large electromagnetic fields such as those found in an electric power plant. Second, because the gage is mounted to a surface which is mechanically independent of the vibrating material, the gap between the gage and the vibrating surface changes as a result of the thermal expansion and contraction of the vibrating material.

Where the vibrating material expands, reducing the gap between the gage and the vibrating material, the gage eventually contacts the vibrating surface causing an electrical short-circuit which renders the gage inoperable. Where the vibrating material contracts, enlarging the gap between the gage and the vibrating material, the separation of the two eventually exceeds the range of linear response of the gage, causing inaccurate amplitude readings.

It would be advantageous, therefore, to provide a device capable of measuring the amplitude of high frequency vibration such that the device is insensitive to the electrical activity within and surrounding the vibrating material and such that the device adapts to the expansion and contraction of the vibrating material so as continually to provide an accurate output of the amplitude of vibration.

A second type of known prior art device capable of measuring the amplitude of high frequency vibration is a gage based upon the eddy current principle. In this technique, an alternating current of a given frequency is generated in a primary coil producing a changing magnetic field surrounding the primary coil. This magnetic field induces an alternating current of the same frequency in a secondary coil located near the primary coil.

With the introduction of an electrically conductive target material into the magnetic field, eddy current flows induced in the target material by the original magnetic field give rise to an opposing magnetic field. This interaction results in a reduction of the flow of current in the secondary coil, the current flow decreasing proportionally as the target material is pressed deeper into the original magnetic field. It is thus possible to determine the separation between a gage housing the primary and secondary coils and a target material.

Because the gage need only detect current of a given frequency in the secondary coil, other electrical activity may be screened out making this gage somewhat less sensitive to electrical activity associated with the target material. Its immunity to such electrical activities, however, is not complete. The disadvantages of expansion and contraction of the target material, resulting in the electrical shorting of the gage or operation in a region of nonlinear response, plague the eddy current gage as well as the capacitance gage. The eddy current gage has an additional disadvantage in that it must be recalibrated for each target material which is comprised of a different type of metal. It would therefore be advantageous that the device capable of measuring high frequency vibration amplitude have the additional feature of lack of dependence upon the type of material whose vibration amplitude is being measured.

Hence, there is a need for an improved vibration amplitude measuring device capable of measuring high frequency mechanical vibration as well as lower frequency vibration, capable of tracking thermal expansion and contraction of the vibrating material so as to maintain accurate measurement of the amplitude and capable of operating without diminished accuracy in an electrically active environment.

SUMMARY OF THE INVENTION

This invention provides for a device for the measurement of vibration amplitude and frequency. The device comprises a sensor having a probative surface, a sensor housing having a front face, a base housing having a front face with a bore therethrough and an electronics package for interpreting and indicating the output of the sensor. The sensor is supported within the sensor housing so that the probative surface of the sensor is located a predetermined distance from the front face of the sensor housing. The sensor housing is supported within the base housing so that the sensor housing is permitted to slide along the bore within the base housing. The sensor housing is biased by some means along the path of travel created by the bore so that the front face of the sensor housing protrudes from the front face of the base housing and makes forcible contact with the target surface. When the target surface is caused to vibrate, the sensor housing remains relatively stationary at one peak of the vibration, changing position with the thermal expansion or contraction of the vibrating surface while the sensor detects variations in the position of the target surface due to vibration.

BRIEF DESCRIPTION OF THE DRAWINGS

FIG. 1 shows the vibration amplitude measuring device in two parts, the upper portion being an enlarged schematic, axial sectional view of the sensing part of the device and the lower portion being a drawing of the physical exterior of the interpreting and indicating part of the device;

FIG. 2 is an electrical schematic for the preferred embodiment of the interpreting and indicating part of the device; and FIG. 3 is an alternative embodiment of the sensing part of the device depicting a different means for affixing this part of the device against the vibrating surface.

DESCRIPTION OF THE PREFERRED EMBODIMENT

A vibration amplitude measuring device, arranged in accordance with the principles of the invention depicted in FIG. 1, basically comprises electronic means for sensing changes in the position of a target surface, preferably in a form which includes circuit elements which use light as a sensing medium as in a photonic sensor 2, a cylindrical sensor housing 4 in which the photonic sensor 2 is mounted, a base housing 6 inside which the sensor housing 4 is located and an electronics package 8 which powers, interprets and indicates the output of the photonic sensor 2. Alternative embodiments of the electronic sensor include a capacitance probe and an eddy current probe.

The photonic sensor 2 is an electronic device such as the OP708 which may be purchased from Optron, Inc., 1201 Tappan Circle, Carrollton, Tex. 75006, and is described in the Optron Bulletin No. 1072. The photonic sensor 2 is held in place near the front end 10 of the sensor housing 4 by a screw 52 so that the light-emitting diode and phototransistor contained within the photonic sensor 2 are exposed to a target surface 12. The photonic sensor 2 is recessed from the front face 10 of the sensor housing 4 a predetermined distance to ensure that the photonic sensor 2 is operating in a region of linearity.

The base housing 6 comprises a solid metal cube with a cylindrical bore 14, having an inner diameter approximately the same as the outer diameter of the sensor housing 4 so that the sensor housing 4, when inserted into the bore 14 in the base housing 6, will slide with a minimum of friction along the lengthwise dimension of the bore 14 but is constrained from movement in the radial dimension. The bore 14 extends from the front face 16 of the base housing 6 through the center of the base housing 6 to a point 18 a short distance from the rear face 20 of the base housing 6. A bore 22 of lesser diameter extends from the rear end 18 of the larger bore 14 to the rear face 20 of the base housing 6, providing a path for a cable 48 between the photonic sensor 2 and the electronics package 8.

The sensor housing 4, inserted into the larger bore 14 of the base housing 6, is biased away from the rear end 18 of the larger bore 14 by a spring 24, so that the front face 10 of the sensor housing 4 protrudes approximately 0.10 inch from the front face 16 of the base housing 6.

To operate the vibration measuring device, the base housing 6 is mounted on a surface 50 which is seismically independent of the target surface 12. The mount may be by any means, such as screws, which binds the base housing 6 to the independent surface 50. In an alternative embodiment, see FIG. 3, the base housing 6 may be mounted directly on the target surface 12 itself. In both embodiments the front face 10 of the sensor housing 4 is brought into contact with the motionless target surface 12 depressing slightly the spring 24 to maintain that contact. A balance potentiometer 26 in the electronics package 8 is adjusted so that the display 28 reads zero when the vibration monitoring device is in position against the motionless target surface 12.

When the target surface 12 begins to vibrate, the sensor housing 4 is depressed slightly toward the rear end 18 of the larger bore 14 to a point corresponding to one peak of the amplitude of vibration of the target surface 12. The sensor housing remains relatively stationary at a position corresponding to this peak of vibration while the target surface 12 vibrates. The relationship between the spring constant of the spring 24 and the mass of the sensor housing 4 is such that the sensor housing 4 will follow changes in the position of the vibration peak due to expansion or contraction of the vibrating material 12, but the sensor housing 4 will not track the frequency of vibration of the vibrating surface 12. The spring constant of the spring 24 and the mass of the sensor housing 4 may be chosen so as to achieve this result at any frequency of vibration of the target surface 12.

The electronics package 8 is shown with the photonic sensor 2 in greater detail in FIG. 2. The photonic sensor 2 in the front end of the sensor housing 4 comprises a light-emitting diode 30 which projects a beam of light toward the target surface 12 and a phototransistor 32 which is sensitive to light reflected from the target surface 12. When the target surface 12 vibrates, the intensity of light reflected from the target surface 12 varies inversely with the distance between the front face 10 of the sensor housing 4 and the target surface 12. The output current of the phototransistor 32 varies directly with the intensity of light detected.

A stable current source 34 provides the current to drive the light-emitting diode 30 in the photonic sensor 2. A stable voltage source 36 provides the biasing for the phototransistor 32 in the photonic sensor 2 and for an amplifier 38.

An LED current adjustment 46 in the electronics package 8 provides a means of adjusting the output current from the stable current source 34. This enables adjustment of the intensity of light produced by the light-emitting diode 30 so that the range of intensities detected by the phototransistor 32 can remain constant despite variations in the reflectivity of target surfaces 12.

The phototransistor 32 in the photonic sensor 2, when excited by a light source, generates a current proportional to the intensity of the light detected. This current is fed into the amplifier 38, the output of which is connected to a digital voltmeter 40. A selector switch 42 in the electronics package 8 provides an alternative 10:1 attenuation of the output signal from the amplifier 38. The output signal of the amplifier 38 may also be viewed on an oscilloscope by means of the Amp Out connection 44 on the electronics package 8.

What is claimed is:

1. A device for the measurement of vibration amplitude and frequency comprising:

sensor means having a probative surface for monitoring variations in the position of a target surface relative to a point located a predetermined distance from the probative surface and having means for generating an output indicative of the target surface position, means for interpreting and indicating the output of said sensor means, a sensor housing having a front face for contacting the target surface, means for supporting said sensor means within said sensor housing so that the probative surface of said sensor means is positioned said predetermined distance from the front face of said sensor housing, providing a path for communication between the probative surface of said sensor means and the target surface, a base housing having a front face having an opening therein, means for supporting said sensor housing within said base housing so that said sensor housing is permitted to slide along an axis within said base housing, defining a path of travel communicating with the opening in the front face of said base housing, and biasing means within said base housing to bias said sensor housing along the path of travel against the target surface with the front face of said sensor housing protruding from the front face of said base housing so that when the target surface is caused to vibrate, said sensor housing remains substantially stationary at one peak of vibration, tracking thermally induced changes in the position of one peak of vibration, while said sensor means detects variations in the position of the target surface due to vibration.

2. A device according to claim 1 wherein means are provided for affixing said base housing to a surface seismically independent from the target surface so that said base housing is not influenced by the motion of the target surface.

3. A device according to claim 1 wherein means are provided for affixing said base housing to the target surface so that said base housing vibrates with the target surface.

4. A device according to claim 2 or claim 3 wherein said sensor means comprises a light-emitting diode and a phototransistor thereby employing light as the sensing medium.

5. A device according to claim 2 or claim 3 wherein said means for interpreting and indicating the output of said sensor means comprises an electronic circuit to condition that output of said sensor means and a digital voltmeter to display the resulting conditioned output.

* * * * *